(12) United States Patent
Pettersson

(10) Patent No.: US 8,497,901 B2
(45) Date of Patent: Jul. 30, 2013

(54) METHOD AND DEVICE FOR EXACT MEASUREMENT OF OBJECTS

(75) Inventor: Bo Pettersson, London (GB)

(73) Assignee: Hexagon Metrology AB, Stockholm (SE)

( * ) Notice: Subject to any disclaimer, the term of this patent is extended or adjusted under 35 U.S.C. 154(b) by 734 days.

(21) Appl. No.: 12/594,293

(22) PCT Filed: Apr. 2, 2008

(86) PCT No.: PCT/SE2008/050379
§ 371 (c)(1),
(2), (4) Date: Mar. 12, 2010

(87) PCT Pub. No.: WO2008/121073
PCT Pub. Date: Oct. 9, 2008

(65) Prior Publication Data
US 2010/0208062 A1    Aug. 19, 2010

(30) Foreign Application Priority Data

Apr. 3, 2007   (SE) ........................................ 0700830

(51) Int. Cl.
*H04N 7/18* (2006.01)

(52) U.S. Cl.
USPC ........... 348/135; 348/137; 348/140; 382/106; 702/127

(58) Field of Classification Search
USPC ...... 348/140, 135, 137, 45; 382/106; 702/127
See application file for complete search history.

(56) References Cited

U.S. PATENT DOCUMENTS

| 5,251,156 | A  | * | 10/1993 | Heier et al. ................... 702/167 |
| 6,121,999 | A  | * | 9/2000  | Schaack .......................... 348/45 |
| 6,973,734 | B2 | * | 12/2005 | Raab et al. ...................... 33/503 |
| 8,233,041 | B2 | * | 7/2012  | Ikeda et al. ................... 348/129 |
| 2003/0191603 | A1 | * | 10/2003 | Raab et al. ................... 702/150 |

FOREIGN PATENT DOCUMENTS

| EP | 1 434 028 | 6/2004 |
| WO | 99/12082 | 3/1999 |

OTHER PUBLICATIONS

International Search Report dated Jul. 10, 2008, from corresponding PCT application.

* cited by examiner

*Primary Examiner* — Frantz Jean
(74) *Attorney, Agent, or Firm* — Young & Thompson

(57) ABSTRACT

A method and a device for the accurate measurement of objects, where, according to the invention, a camera (4) is arranged on a manually operated portable jointed arm (1) in order to take two-dimensional images of the object that is to be measured and where the measurements are carried out based on the two-dimensional images taken with the camera (4) and based on the displacements that are carried out by the jointed arm (1) during the measurements.

20 Claims, 2 Drawing Sheets

METHOD AND DEVICE FOR EXACT MEASUREMENT OF OBJECTS

BACKGROUND OF THE INVENTION

1. Field of the Invention

Figure 1:
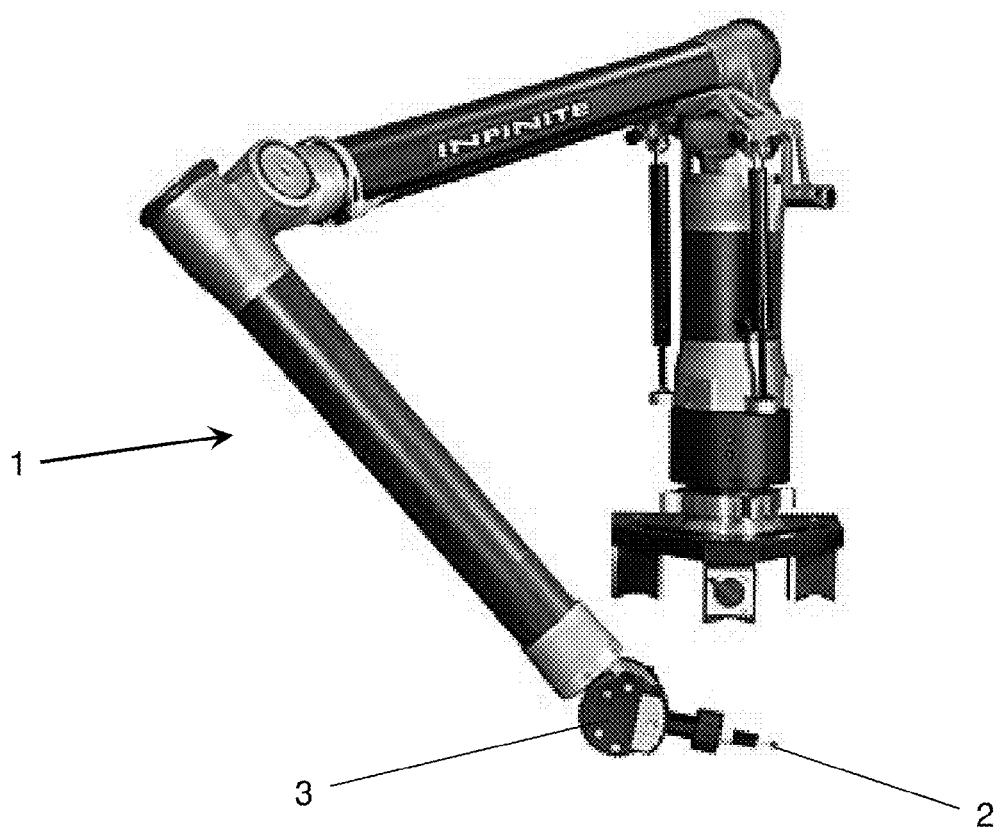

The present invention relates to a method and a device for the exact measurement of objects.

2. Description of the Related Art

The use of what are known as jointed arms for a number of different measurement methods during measurement operations is known. Typical measurements are carried out with a contact measurement probe or with a mechanically attached measurement probe. Other measurement methods are carried out using laser sensors of various types. It is necessary in both cases to displace the arm between different measurement points in order to record the data required. The same is true also for other types of equipment that can be displaced, such as laser readers.

SUMMARY OF THE INVENTION

It is one purpose of the present invention to achieve a method and a device for measurement with the aid of manually operated and portable measurement equipment comprising a jointed arm, but equipment for which it is not necessary to displace the jointed arm for each measurement point.

The purpose of the invention described above is achieved with a method in which a camera is arranged on a jointed arm with a support that is immobile during the measurement in order to take two-dimensional images of the object that is to be measured and where the measurements are carried out based on the two-dimensional images taken with the camera and based on the displacements that are carried out by the jointed arm.

The purpose of achieving a device for measurement is solved according to the invention through the device arrangement comprising a camera arranged on a jointed arm with a support that is immobile during the measurement with which it is possible to take two-dimensional images of the object that is to be measured, and where such images and the displacements that are carried out by the jointed arm are used as a basis for measuring the object.

BRIEF DESCRIPTION OF THE DRAWING FIGURES

Figure 2:
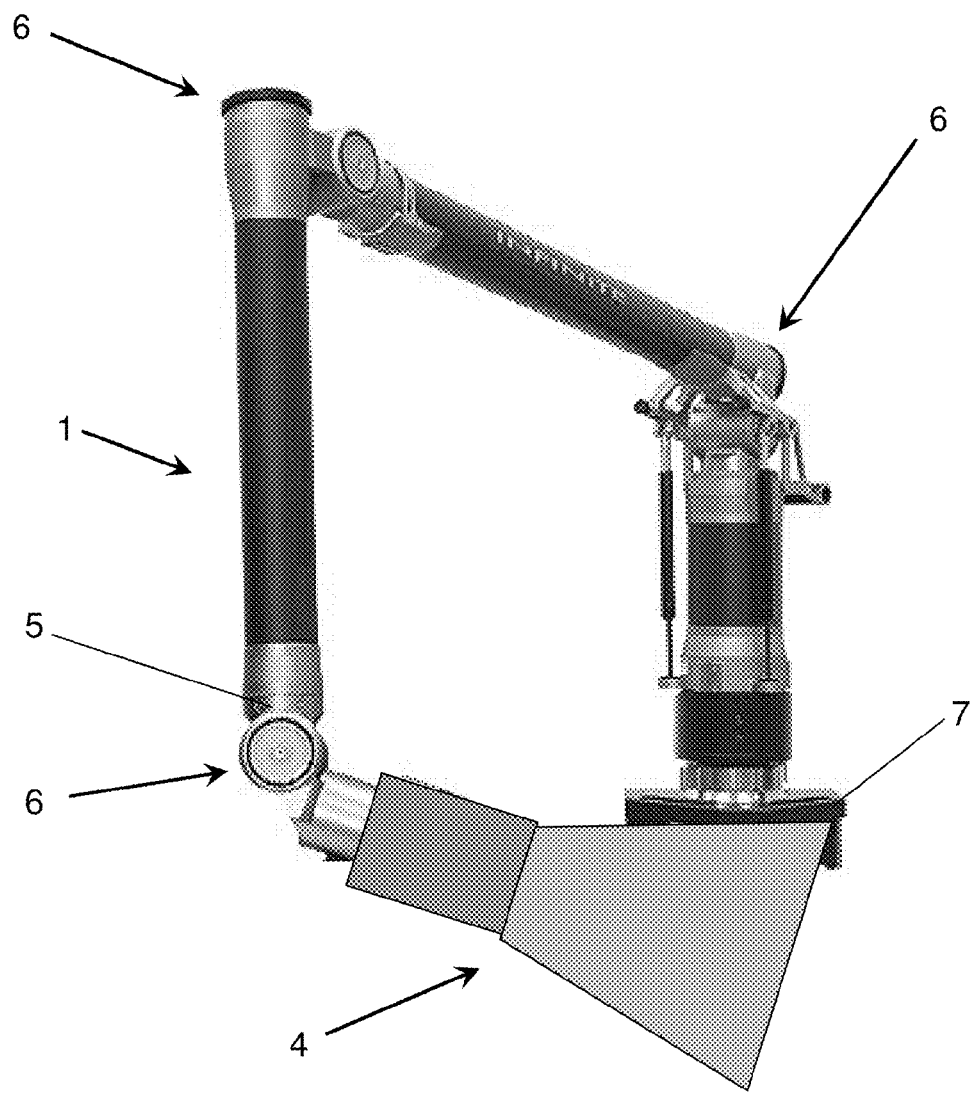

The invention will now be described in more detail in the form of a pair of non-limiting embodiments, and with the aid of the attached drawings, in which FIG. 1 shows a traditional measurement device comprising a jointed arm with a measurement probe arranged at the free end of the jointed arm, and FIG. 2 shows a measurement device according to the invention with a camera arranged at the end of a jointed arm.

DETAILED DESCRIPTION OF THE INVENTION

A measurement device of known type is shown in FIG. 1, comprising a jointed arm 1 with a measurement probe 2 arranged at its free end. In order to measure an object, not shown in the drawings, the measurement probe 2 is brought into contact with the object that is to be measured at a number of points, depending on the extent and form of the object. In order for it to be possible for the measurement probe to be brought into contact with these points, the jointed arm must be displaced, and it may also be necessary that the pivotable attachment 3 of the measurement probe 2 be pivoted. Not only does this take time, the displacements and the pivoting movements of the measurement probe 2 give rise to measurement errors.

According to the invention, a portable device arrangement is now suggested as an alternative that, as is shown in FIG. 2, comprises, instead of a measurement probe for contact measurement, a camera 4 at the free end 5 of the jointed arm 1, in order to take with the camera 4 two-dimensional images of the object that is to be measured, and where the measurements are carried out based on the two-dimensional images and the displacements that are recorded by the jointed arm 1 while the camera 4 is being displaced. The camera 4 can be displaced with the aid of the jointed arm 1 to the desired position relative to the object that is to be measured, and at the same time sensors incorporated into the jointed arm can record not only changes in angle but also pivoting movements of the joints 6 of the arm.

In order to obtain a correct measurement value, it is required that either a reference scale also is arranged on or at the object that is to be measured or that the camera 4 comprises a means of measuring distance such as, for example, a laser measure, in order to give the exact distance from the camera to the object. In the latter case, the dimensions of the object that is to be measured can be calculated based on knowledge of the lens parameters of the camera. Since the dimensions and angles of the arms and joints 6 of the jointed arm are known, it is possible to calculate at all times the exact displacement of the attachment point of the camera 4 with the aid of sensors in the joints, and it is possible in this way to calculate with very high precision the dimensions of the object that is being measured with the aid of the jointed arm and the camera through knowledge of how the images are taken relative to each other.

Several advantages are achieved and possibilities opened by the use of a camera 4 instead of a contact measurement probe.

Thus can, for example, several images taken with the camera be put together to form a composite image such that an object larger than that which can be covered by the camera with a single image can be taken in order to form the basis for a measurement of the complete object.

Three-dimensional images can in the same way be created by the use of photogrammetry on images on one part taken from different views.

It is also possible that the camera be provided with integral illumination in order to obtain an image of higher quality in order to facilitate the recording of points for measurement.

A measurement device according to the invention that is manually operated and portable can be easily transported between different locations at which it is necessary to carry out measurements, and since the support 7 of the arm 1 is held stationary during the measurement, it is possible to measure the dimensions of the object solely with the aid of the units that are integral to the arm and the camera 4. It is not necessary to carry out external calibration in order to obtain a reproducible and accurate measurement result.

The method according to the invention is particularly suitable for the measurement of two-dimensional objects such as, for example, punched sheet metal items.

The method is also admirably suitable for the measurement of holes.

The invention claimed is:

1. A method for the accurate measurement of objects, comprising:

arranging a camera (4) on a manually operated portable jointed arm (1) mounted under a support (7) that is immobile during the measurement, in order to take two-dimensional images of the object that is to be measured and where the measurements are carried out based on the two-dimensional images taken with the camera (4) and based on displacements that are carried out by jointed arm (1) during the measurements.

2. The method according to claim 1, wherein the measurements are made relative to a reference scale arranged on or at the object that is to be measured.

3. The method according to claim 2, wherein measurement of large objects is carried out by compilation of several images taken with the camera.

4. The method according to claim 2, wherein the method is used in order to create a three-dimensional image of the object with photogrammetry and images taken from different views of the same object.

5. The method according to claim 1, wherein the camera is provided with a means for measuring distance and in that the measurement result is calculated based on a distance measured between the object and the camera.

6. The method according to claim 5, wherein the method is used in order to create a three-dimensional image of the object with photogrammetry and images taken from different views of the same object.

7. The method according to claim 5, wherein the method is used in order to create a three-dimensional image of the object with photogrammetry and images taken from different views of the same object.

8. The method according to claim 1, wherein measurement of large objects is carried out by compilation of several images taken with the camera.

9. The method according to claim 1, wherein the method is used in order to create a three-dimensional image of the object with photogrammetry and images taken from different views of the same object.

10. The method according to claim 1, wherein an exact displacement for an attachment point of the camera is calculable at all times.

11. A device for the accurate measurement of objects, comprising:

a camera (4) arranged on a manually operated portable jointed arm (1); and a support (7) that is immobile during the measurement, with which camera (4) two-dimensional images of the object that is to be measured can be taken and which images, together with displacements that are carried out by jointed arm (1) are used as a basis for measuring the object.

12. The device according to claim 11, wherein the jointed arm (1) comprises joints (6) within which integral sensors arranged to record not only changes in angle, but also rotation of the joints (6) of the arm.

13. The device according to claim 12, wherein the camera (4) is arranged such that the camera can pivot at a free end (5) of the jointed arm, and sensors are arranged in order to record a pivoting movement of the camera (4) relative to the arm (1).

14. The device according to claim 13, wherein device also comprises a means of measuring distance between the camera (4) and the object that is to be measured.

15. The device according to claim 13, wherein the device also comprises an illumination arrangement in order to illuminate the object that is to be measured.

16. The device according to claim 12, wherein the device also comprises a means for measuring distance between the camera (4) and the object that is to be measured.

17. The device according to claim 12, wherein the device also comprises an illumination arrangement in order to illuminate the object that is to be measured.

18. The device according to claim 11, wherein the device also comprises a means for measuring distance between the camera (4) and the object that is to be measured.

19. The device according to claim 18, wherein the device also comprises an illumination arrangement in order to illuminate the object that is to be measured.

20. The device according to claim 11, wherein the device also comprises an illumination arrangement in order to illuminate the object that is to be measured.

\* \* \* \* \*

UNITED STATES PATENT AND TRADEMARK OFFICE
CERTIFICATE OF CORRECTION

PATENT NO.      : 8,497,901 B2
APPLICATION NO. : 12/594293
DATED           : July 30, 2013
INVENTOR(S)     : Bo Pettersson It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 892 days.

Signed and Sealed this

Fifteenth Day of September, 2015

Michelle K. Lee
*Director of the United States Patent and Trademark Office*